US012605919B2

(12) United States Patent
Kim et al.

(10) Patent No.: US 12,605,919 B2
(45) Date of Patent: Apr. 21, 2026

(54) SOUND-ABSORBING MATERIAL FOR ELECTRIC VEHICLE

(71) Applicants: Hyundai Motor Company, Seoul (KR); Kia Corporation, Seoul (KR); Korea Vilene Co., Ltd., Gyeonggi-do (KR); Daehan Solution Co., Ltd., Incheon (KR)

(72) Inventors: Tae Yoon Kim, Daejeon (KR); Oh Deok Kwon, Gyeonggi-do (KR); Keun Young Kim, Gyeonggi-do (KR); Kyoung Min Choi, Seoul (KR); Yong Kgil Jung, Gyeonggi-do (KR); Se Young Jung, Gyeonggi-do (KR); Jong Oh Kang, Gyeonggi-do (KR)

(73) Assignees: Hyundai Motor Company, Seoul (KR); Kia Corporation, Seoul (KR); Korea Vilene Co., Ltd., Pyeongtaek (KR); Daehan Solution Co., Ltd., Incheon (KR)

( * ) Notice: Subject to any disclaimer, the term of this patent is extended or adjusted under 35 U.S.C. 154(b) by 205 days.

(21) Appl. No.: 18/644,805

(22) Filed: Apr. 24, 2024

(65) Prior Publication Data

US 2025/0100467 A1 Mar. 27, 2025

(30) Foreign Application Priority Data

Sep. 21, 2023 (KR) ......................... 10-2023-0126456

(51) Int. Cl.
*B32B 5/26* (2006.01)
*B32B 5/24* (2006.01)
*B32B 7/14* (2006.01)

(52) U.S. Cl.
CPC .............. *B32B 5/268* (2021.05); *B32B 5/245* (2013.01); *B32B 7/14* (2013.01); *B32B 2250/04* (2013.01); *B32B 2250/05* (2013.01); *B32B 2266/0278* (2013.01); *B32B 2307/7376* (2023.05); *B32B 2605/00* (2013.01)

(58) Field of Classification Search
CPC ........... B32B 5/268; B32B 5/245; B32B 7/14; B32B 2250/04; B32B 2250/05; B32B 2266/0278; B32B 2307/7376; B32B 2605/00
USPC ......................................................... 428/201
See application file for complete search history.

(56) References Cited

U.S. PATENT DOCUMENTS

| | | | | | |
|---|---|---|---|---|---|
| 4,111,081 | A | * | 9/1978 | Hilliard | G10K 11/168 |
| | | | | | 428/116 |
| 4,594,287 | A | * | 6/1986 | Hucke | C04B 35/521 |
| | | | | | 428/407 |
| 2012/0053545 | A1* | | 3/2012 | Love | A61F 13/513 |
| | | | | | 604/374 |
| 2025/0100467 | A1* | | 3/2025 | Kim | B32B 5/266 |

FOREIGN PATENT DOCUMENTS

| | | | |
|---|---|---|---|
| JP | 2016-79511 | A | 5/2016 |
| JP | 6349019 | B1 | 6/2018 |

(Continued)

*Primary Examiner* — Betelhem Shewareged
(74) *Attorney, Agent, or Firm* — Fox Rothschild LLP

(57) ABSTRACT

Disclosed is a sound-absorbing material for an electric vehicle including a heat-sealed non-woven fabric, a dot-pattern adhesive layer disposed on the heat-sealed non-woven fabric, and a melt blown non-woven fabric disposed on the dot-pattern adhesive layer.

20 Claims, 4 Drawing Sheets

MELT BLOWN NON-WOVEN FABRIC

DOT-PATTERN ADHESIVE LAYER

HEAT-SEALED NON-WOVEN FABRIC

SOUND RECEIVING DIRECTION

(56)  References Cited

FOREIGN PATENT DOCUMENTS

| | | | |
|---|---|---|---|
| JP | 6585383 | B2 | 10/2019 |
| KR | 10-1345215 | B1 | 1/2014 |
| KR | 10-2018-0036055 | A | 4/2018 |
| KR | 10-2022-0117392 | A | 8/2022 |

* cited by examiner

MELT BLOWN NON-WOVEN FABRIC

DOT-PATTERN ADHESIVE LAYER

HEAT-SEALED NON-WOVEN FABRIC

SOUND RECEIVING DIRECTION

HEAT-SEALED NON-WOVEN FABRIC

POLYURETHANE FOAM LAYER

MELT BLOWN NON-WOVEN FABRIC

DOT-PATTERN ADHESIVE LAYER

HEAT-SEALED NON-WOVEN FABRIC

SOUND-ABSORBING MATERIAL FOR ELECTRIC VEHICLE

CROSS-REFERENCE TO RELATED APPLICATION

This application claims the benefit of priority to Korean Patent Application No. 10-2023-0126456, filed in the Korean Intellectual Property Office on Sep. 21, 2023, the entire contents of which are incorporated herein by reference.

TECHNICAL FIELD

The present disclosure relates to a sound-absorbing material for an electric vehicle that improves a sound-absorbing performance in a high-frequency range.

BACKGROUND

Recently, as a structure of an automobile industry has changed from an internal combustion engine vehicle to an electrified vehicle, a need for development in a field of NVH (noise, vibration, and harshness), which is one of five performance characteristics of the vehicle, is increasingly emerging.

In particular, in a case of electric vehicle, which is attracting attention as a main type of future mobility, an overall noise level is relatively low compared to that of the internal combustion engine vehicle, but new types of noise transmitted to indoors, such as road noise and wind noise, are emerging.

In one example, noise generated from the existing internal combustion engine vehicle was in a low frequency range of 800 to 2,000 Hz, and a sound-absorbing material for absorbing the noise has been used. However, in the case of electric vehicle, as the vehicle is driven by an electric motor instead of an internal combustion engine, noise in a high frequency range equal to or higher than 2,000 Hz occurs from the motor.

Accordingly, there is an increasing demand for a development of a new sound-absorbing material for the electric vehicle that may effectively absorb the noise in the high frequency range.

SUMMARY

The present disclosure has been made to solve the above-mentioned problems occurring in the prior art while advantages achieved by the prior art are maintained intact.

An aspect of the present disclosure provides a sound-absorbing material for an electric vehicle that utilizes heat-sealed non-woven fabric and melt blown non-woven fabric that may effectively absorb high-frequency noise and utilizes a dot-pattern adhesive layer that may improve air permeability.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a sound-absorbing material for an electric vehicle includes a heat-sealed non-woven fabric, a dot-pattern adhesive layer disposed on the heat-sealed non-woven fabric, and a melt blown non-woven fabric disposed on the dot-pattern adhesive layer.

The heat-sealed non-woven fabric may be disposed on a sound receiving side.

The heat-sealed non-woven fabric may be obtained from a constituent fiber comprising at least one selected from a group consisting of thermoplastic polyester elastomer, polycaprolactone, polybutylene terephthalate, polyethylene terephthalate, polyacrylonitrile, polypropylene, polyethylene, polyurethane, and mixtures thereof.

The heat-sealed non-woven fabric may have a constituent fiber thickness in a range of about 2 to about 5 denier and a weight for each unit area size in a range of about 40 to about 80 $g/m^2$.

The melt blown non-woven fabric may include at least one selected from a group consisting of thermoplastic polyester elastomer, polycaprolactone, polybutylene terephthalate, polyethylene Terephthalate, polyacrylonitrile, polypropylene, polyethylene, polyurethane, and mixtures thereof.

The melt blown non-woven fabric may have a constituent fiber thickness in a range of about 0.5 to about 20 μm and a weight for each unit area size in a range of about 40 to about 80 $g/m^2$.

The heat-sealed non-woven fabric and the melt blown non-woven fabric may be bonded together via the dot-pattern adhesive layer.

The dot-pattern adhesive layer may contain a plurality of dots arranged to be spaced apart from each other and made of an adhesive polymer resin.

The dot-pattern adhesive layer may contain a plurality of dots arranged to be spaced apart from each other at a spacing in a range of about 0.05 to about 0.08 mm and having a diameter in a range of about 0.03 to about 0.08 mm.

The adhesive polymer resin may include at least one selected from a group consisting of nylon, polyacrylonitrile, polystyrene, polyvinyl chloride, polyvinyl alcohol, an ethylenevinyl chloride resin, an ethylene vinyl acetate resin, polyurethane, polyester, polyvinylacetate, and mixtures thereof.

The dot-pattern adhesive layer may have a weight for each unit area size in a range of about 10 to about 26 $g/m^2$.

The sound-absorbing material may further include a polyurethane foam layer disposed on the melt blown non-woven fabric. The polyurethane foam layer may have a thickness in a range of about 15 to about 30 mm and a density in a range of about 12 to about 20 $kg/m^3$.

The sound-absorbing material may further include a heat-sealed non-woven fabric disposed on the polyurethane foam layer.

The sound-absorbing material may further include a melt blown non-woven fabric disposed on the polyurethane foam layer.

The sound-absorbing material may further include a dot-pattern adhesive layer disposed on the melt blown non-woven fabric.

The sound-absorbing material may further include a heat-sealed non-woven fabric disposed on the dot-pattern adhesive layer.

In another exemplary embodiment, a sound-absorbing material for an electric vehicle is provided. The sound-absorbing material may include a heat-sealed non-woven fabric; a dot-pattern adhesive layer disposed on the heat-sealed non-woven fabric; a melt blown non-woven fabric disposed on the dot-pattern adhesive layer; a polyurethane foam layer disposed on the melt blown non-woven fabric; and a heat-sealed non-woven fabric disposed on the polyurethane foam layer.

In another exemplary embodiment, a sound-absorbing material for an electric vehicle is provided. The sound-absorbing material may include a heat-sealed non-woven fabric; a dot-pattern adhesive layer disposed on the heat-sealed non-woven fabric; a melt blown non-woven fabric disposed on the dot-pattern adhesive layer; a polyurethane foam layer disposed on the melt blown non-woven fabric; a melt blown non-woven fabric disposed on the polyurethane foam layer, a dot-pattern adhesive layer disposed on the melt blown non-woven fabric; and a heat-sealed non-woven fabric disposed on the dot-pattern adhesive layer.

As discussed, the method and system suitably include use of a controller or processer.

In another exemplary embodiment, vehicles are provided that comprise an apparatus as disclosed herein. The vehicles are preferably electric vehicles.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
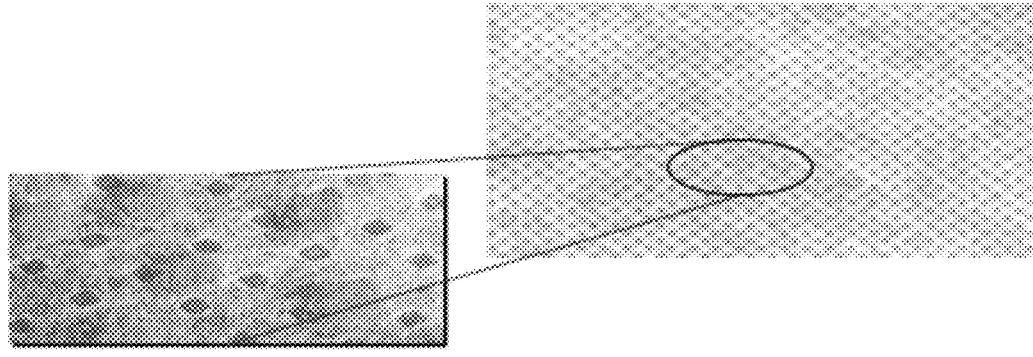
FIG. 1 is an image capturing a dot-pattern adhesive layer of a sound-absorbing material for an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, a sound-absorbing material for an electric vehicle will be described in detail such that those skilled in the art may easily practice the present disclosure.

The sound-absorbing material for the electric vehicle according to an exemplary embodiment of the present disclosure may include: a heat-sealed non-woven fabric; a dot-pattern adhesive layer disposed on the heat-sealed non-woven fabric; and a melt blown non-woven fabric disposed on the dot-pattern adhesive layer.

The heat-sealed non-woven fabric may be manufactured by heat-sealing fiber via a heat-patterned roll without using a separate binder, thereby lowering air flow resistivity while achieving a smooth surface texture, and improving a sound-absorbing performance against high-frequency noise as air permeability is improved. Therefore, the heat-sealed non-woven fabric may be disposed on a sound receiving side to absorb the high-frequency noise first and may serve to protect the melt blown non-woven fabric and a polyurethane foam layer located inside.

In addition, the heat-sealed non-woven fabric may include at least one selected from a group consisting of thermoplastic polyester elastomer, polycaprolactone, polybutylene terephthalate, polyethylene terephthalate, polyacrylonitrile, polypropylene, polyethylene, polyurethane, and mixtures thereof.

Furthermore, the heat-sealed non-woven fabric may have a thickness of the constituent fiber thereof in a range of about 2 to about 5 denier and a weight for each unit area size in a range of about 40 to about 80 g/m², preferably in a range of about 40 to about 55 g/m².

The smaller the thickness of the constituent fiber or the smaller the weight for each unit area size of the heat-sealed non-woven fabric, the lower the durability, and the greater the thickness of the constituent fiber or the greater the weight for each unit area size, the lower the air permeability, so that the heat-sealed non-woven fabric according to the present disclosure is to improve the air permeability while ensuring the durability using the fiber with the thickness and the weight for each unit area size within the above ranges.

The melt blown non-woven fabric may be manufactured by melting a constituent fiber thereof and then spinning fine fiber using high-temperature, high-pressure wind. Because the melt blown non-woven fabric has fine pores, a sound-absorbing effect is very excellent.

In addition, the melt blown non-woven fabric may include at least one selected from a group consisting of thermoplastic polyester elastomer, polycaprolactone, polybutylene terephthalate, polyethylene terephthalate, polyacrylonitrile, polypropylene, polyethylene, polyurethane, and mixtures thereof.

Furthermore, the melt blown non-woven fabric may have a thickness of the constituent fiber thereof in a range of about 0.5 to about 20 μm and a weight for each unit area size in a range of about 40 to about 80 g/m², and preferably in a range of about 50 to about 75 g/m².

Like the heat-sealed non-woven fabric, the smaller the thickness of the constituent fiber or the smaller the weight for each unit area size of the melt blown non-woven fabric, the lower the durability, and the greater the thickness of the constituent fiber or the greater the weight for each unit area size, the lower the air permeability. Therefore, the melt blown non-woven fabric according to the present disclosure is to improve the air permeability while ensuring the durability using the fiber with the thickness and the weight for each unit area size within the above ranges.

The heat-sealed non-woven fabric and the melt blown non-woven fabric may be bonded together via the dot-pattern adhesive layer to form a stacked body.

The dot-pattern adhesive layer may contain a plurality of dots, and the plurality of dots may be arranged to be spaced apart from each other and may be made of an adhesive polymer resin. Therefore, according to the present disclosure, as the dot-pattern adhesive layer is applied, not only may the air permeability be maximized by minimizing air flow obstruction, but a raw material cost may also be reduced compared to an existing front adhesive scheme.

FIG. 1 is an image capturing a dot-pattern adhesive layer of a sound-absorbing material for an electric vehicle according to an exemplary embodiment of the present disclosure. Referring to FIG. 1, it may be seen that the dots contained in the dot-pattern adhesive layers are arranged to be spaced apart from each other.

The dots contained in the dot-pattern adhesive layer may be arranged to be spaced apart from each other at a spacing in a range of 0.05 to 0.08 mm and may have a diameter in a range of 0.03 to 0.08 mm.

When the diameter of the dots is small or the spacing between the dots is great in the dot-pattern adhesive layer, an adhesive strength may decrease and the heat-sealed non-woven fabric and the melt blown non-woven fabric may be peeled, so that a quality of the sound-absorbing material may be deteriorated. On the other hand, when the diameter of the dots is great or the spacing between the dots is small, the air flow obstruction may occur and the sound-absorbing per-formance may be deteriorated. Therefore, the dots in the dot-pattern adhesive layer according to the present disclosure have the diameter and the spacing therebetween within the above ranges to improve the sound-absorbing performance without deteriorating the adhesive strength.

The adhesive polymer resin may include at least one selected from a group consisting of nylon, polyacrylonitrile, polystyrene, polyvinyl chloride, polyvinyl alcohol, an ethylenevinyl chloride resin, an ethylene vinyl acetate resin, polyurethane, polyester, polyvinylacetate, and mixtures thereof.

The dot-pattern adhesive layer may have a weight for each unit area size in a range of about 10 to about 26 g/m².

The smaller the weight for each unit area size of the dot-pattern adhesive layer, the lower the adhesive strength and durability, and the greater the weight for each unit area size, the lower the air permeability. Therefore, the dot-pattern adhesive layer according to the present disclosure is controlled to have the weight for each unit area size within the above range to improve the air permeability while ensuring the durability.

The sound-absorbing material for the electric vehicle according to one embodiment of the present disclosure may further include the polyurethane foam layer disposed on the melt blown non-woven fabric.

The polyurethane foam layer may have a structure in which cells swell inside and are connected to each other via pores. Therefore, in the polyurethane foam layer, sound may be attenuated by a viscous resistance and vibration of air inside the cells, and the sound may be absorbed as vibration energy transmitted to the polyurethane foam layer is converted into heat energy.

A thickness of the polyurethane foam layer may be in a range of about 15 to about 30 mm, and a density thereof may be in a range of about 12 to about 20 kg/m³, preferably in a range of about 12 to about 16 kg/m³.

As the thickness of the polyurethane foam layer increases and the density thereof decreases, the air permeability improves, but the polyurethane foam layer should have durability so as to be used as a component for the electric vehicle. Therefore, the sound-absorbing material for the electric vehicle according to the present disclosure is to improve the air permeability while ensuring the durability using the polyurethane foam layer with the thickness and the density within the above ranges.

Figure 2A:
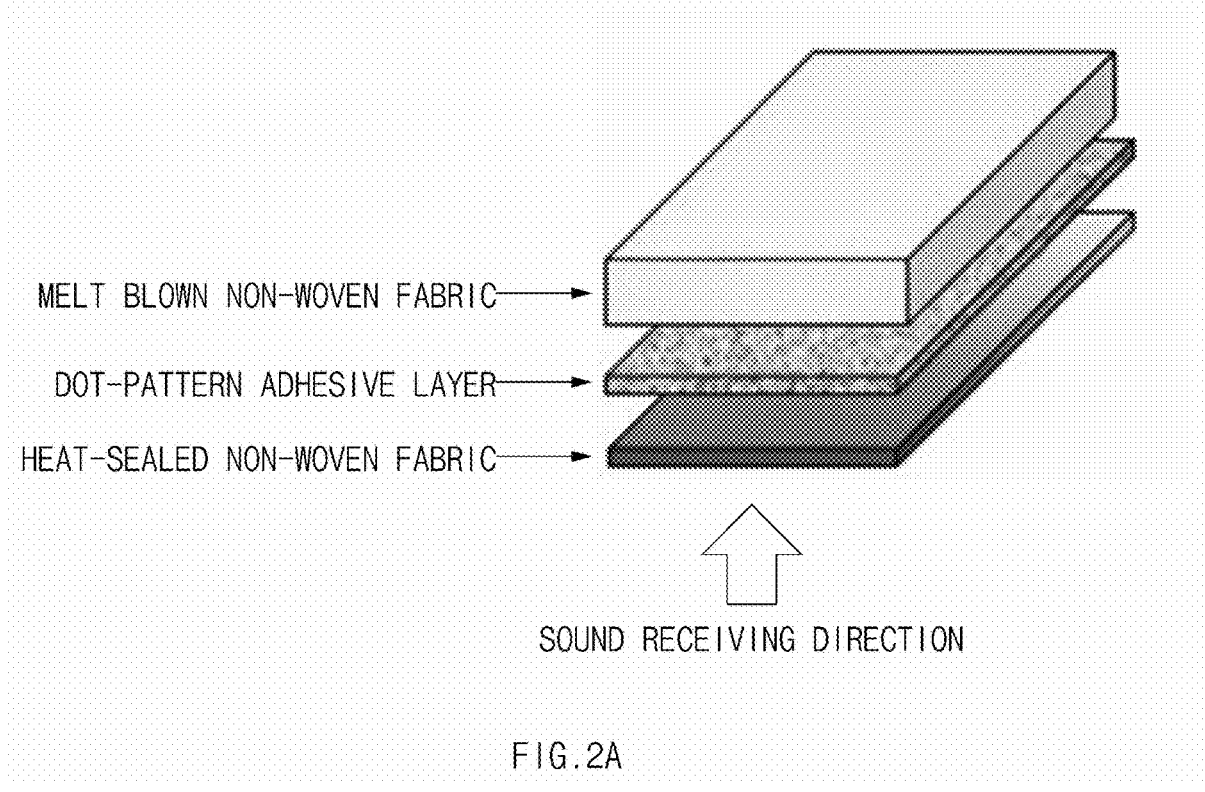
FIGS. 2A, 2B and 2C are respectively schematic diagrams showing sound-absorbing materials for an electric vehicle according to exemplary embodiments of the present disclosure.
Figure 2B:
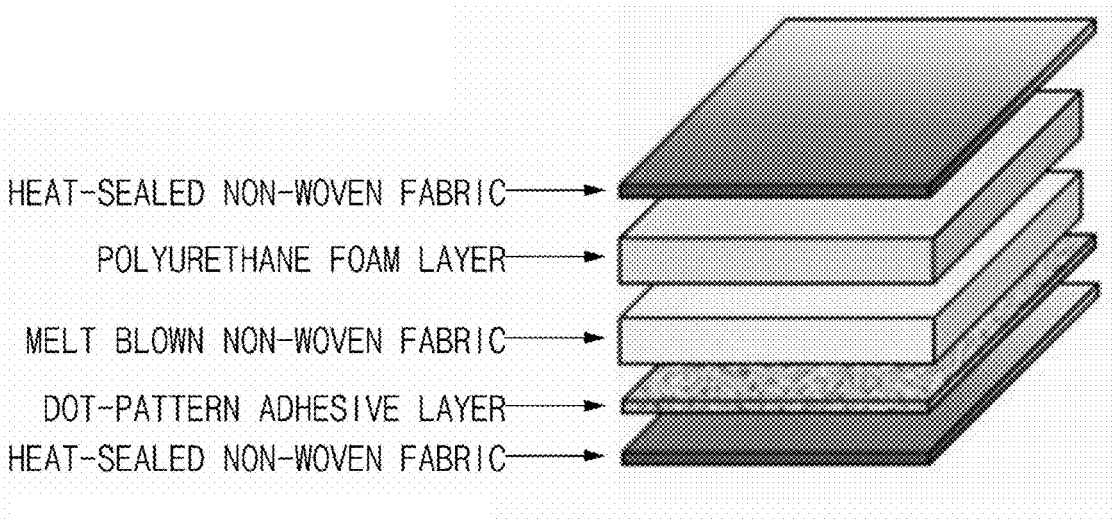

FIGS. 2A to 2B are schematic diagrams showing a sound-absorbing material for an electric vehicle according to an exemplary embodiment of the present disclosure.

Referring to FIG. 2A, it may be seen that the sound-absorbing material for the electric vehicle according to the present disclosure has a structure in which the heat-sealed non-woven fabric is disposed on the sound-absorbing side, the dot-pattern adhesive layer is disposed on the heat-sealed non-woven fabric, and the melt blown non-woven fabric is disposed on the dot-pattern adhesive layer.

Additionally, referring to FIG. 2B, the sound-absorbing material for the electric vehicle according to the present disclosure may further include the polyurethane foam layer on the melt blown non-woven fabric, and may have a structure in which the heat-sealed non-woven fabric is disposed on the polyurethane foam layer.

Figure 2C:
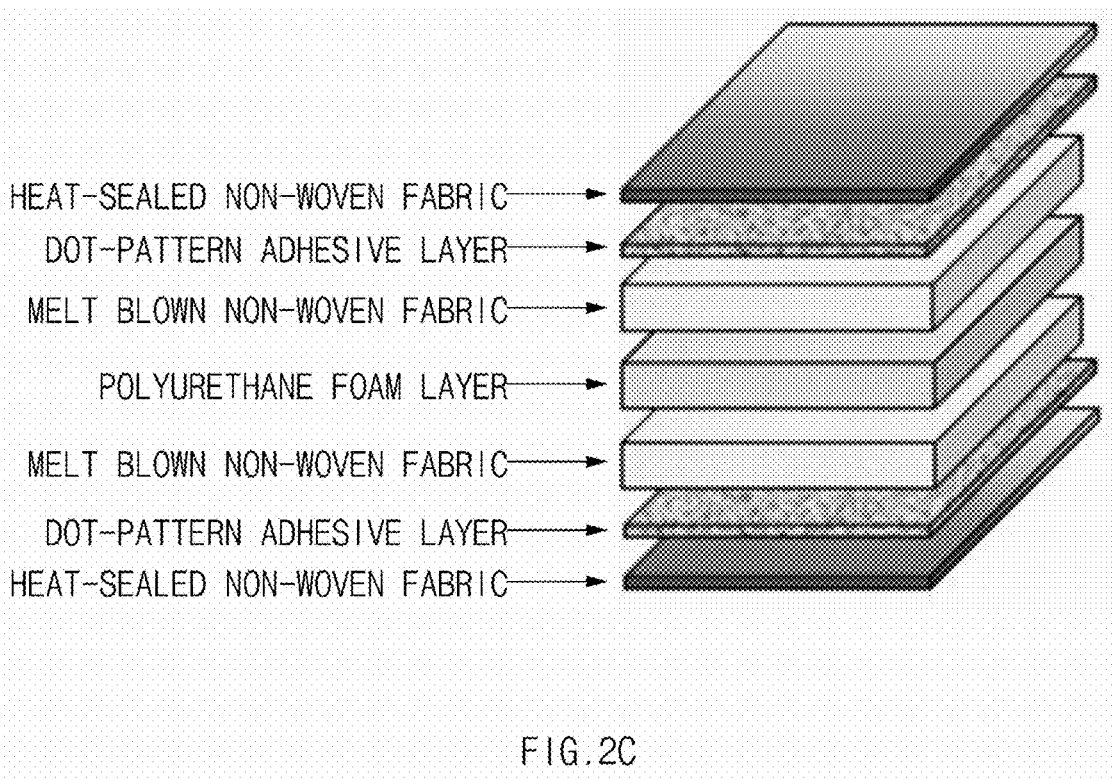

Furthermore, referring to FIG. 2C, to further improve the sound-absorbing performance against the high-frequency noise, the sound-absorbing material may have a structure in which the melt blown non-woven fabric is disposed on the polyurethane foam layer, the dot-pattern adhesive layer is disposed on the melt blown non-woven fabric, and the heat-sealed non-woven fabric is bonded onto the dot-pattern adhesive layer. That is, this may be a structure in which, centered on the polyurethane foam layer, the melt blown non-woven fabrics are disposed on both surfaces of the polyurethane foam layer, and each melt blown non-woven fabric and each heat-sealed non-woven fabric are bonded together via the dot-pattern adhesive layer.

Hereinafter, the present disclosure will be described in more detail via Present Examples. However, such Present Examples are only intended to help understand the present disclosure, and the scope of the present disclosure is not limited to such Present Examples in any way.

<Present Example 1> Manufacture 1 of
Sound-Absorbing Material for Electric Vehicle After a stacked body structure composed of a heat-sealed non-woven fabric, a dot-pattern adhesive layer disposed on the heat-sealed non-woven fabric, and a melt blown non-woven fabric disposed on the dot-pattern adhesive layer was manufactured, a polyurethane foam layer was disposed on the stacked body and a heat-sealed non-woven fabric was disposed on the polyurethane foam layer to manufacture a sound-absorbing material for an electric vehicle.

The heat-sealed non-woven fabric was manufactured by passing a thermoplastic polyester elastomer through a heat-patterned roll to satisfy a fiber thickness of 3 denier and a weight for each unit area size of 60 g/m$^2$.

The melt blown non-woven fabric was manufactured by spinning fine fiber obtained by melting the thermoplastic polyester elastomer to satisfy a fiber thickness of 10 μm and a weight for each unit area size of 40 g/m$^2$.

The dot-pattern adhesive layer was manufactured using nylon to satisfy a weight for each unit area size of 20 g/m$^2$. In one example, in the dot pattern, dots with a diameter of 0.05 mm were arranged at a spacing of 0.06 mm.

The polyurethane foam layer was manufactured to have a thickness of 20 mm and a density of 20 kg/m$^3$.

<Present Example 2> Manufacture 2 of
Sound-Absorbing Material for Electric Vehicle The material was manufactured in the same manner as Present Example 1, except that the weight for each unit area size of the heat-sealed non-woven fabric is 40 g/m$^2$, and the weight for each unit area size of the melt blown non-woven fabric is 60 g/m$^2$.

<Present Example 3> Manufacture 3 of
Sound-Absorbing Material for Electric Vehicle The material was manufactured in the same manner as Present Example 1, except that the density of the polyurethane foam layer is 12 kg/m$^3$.

<Present Example 4> Manufacture 4 of
Sound-Absorbing Material for Electric Vehicle The material was manufactured in the same manner as Present Example 2, except that the density of the polyurethane foam layer is 12 kg/m$^3$.

<Comparative Example 1> Manufacture 5 of
Sound-Absorbing Material for Electric Vehicle The material was manufactured in the same manner as Present Example 1, except that a chemically-bonded non-woven fabric made of an acrylic binder-impregnated polyethylene terephthalate single fiber was used to satisfy a weight for each unit area size of 120 g/m$^2$ instead of the heat-sealed non-woven fabric, the melt blown non-woven fabric, and the dot-pattern adhesive layer.

<Comparative Example 2> Manufacture 6 of
Sound-Absorbing Material for Electric Vehicle The material was manufactured in the same manner as Present Example 3, except that the chemically-bonded non-woven fabric made of the acrylic binder-impregnated polyethylene terephthalate single fiber was used to satisfy the weight for each unit area size of 120 g/m$^2$ instead of the heat-sealed non-woven fabric, the melt blown non-woven fabric, and the dot-pattern adhesive layer.

<Experimental Example 1> Noise
Sound-Absorbing Performance Evaluation Based on
Frequency Table 1 below shows data evaluating the noise sound-absorbing performance based on the frequency.

In this regard, in the noise sound-absorbing performance evaluation, an impedance ratio of the noise absorbed compared to the noise incident on the sound-absorbing material at a room temperature was measured using a sound-absorbing impedance test device based on the ISO 10354-2 test standards.

TABLE 1

| | Impedance ratio based on noise frequency | | | |
| | 2000 Hz | 3150 Hz | 5000 Hz | 6300 Hz |
|---|---|---|---|---|
| Present Example 1 | 0.78 | 0.83 | 0.85 | 0.83 |
| Present Example 2 | 0.86 | 0.85 | 0.88 | 0.89 |
| Present Example 3 | 0.85 | 0.81 | 0.85 | 0.86 |
| Present Example 4 | 0.91 | 0.84 | 0.88 | 0.9 |
| Comparative Example 1 | 0.75 | 0.8 | 0.81 | 0.77 |
| Comparative Example 2 | 0.77 | 0.8 | 0.81 | 0.79 |

Referring to Table 1, Present Examples 1 to 4 showed excellent sound-absorbing performance against noise equal to or higher than 2000 Hz, which is a high-frequency range, but Comparative Examples 1 and 2 showed relatively poor sound-absorbing performance against the noise in the high-frequency range. In other words, the sound-absorbing material including the heat-sealed non-woven fabric, the melt blown non-woven fabric, and the dot-pattern adhesive layer may be determined to be suitable as the sound-absorbing material for the electric vehicle that mainly generates the noise in the high-frequency range.

<Experimental Example 2> Air Flow Resistivity
Evaluation

Table 2 below shows data evaluating the air flow resistivity.

In this regard, the air flow resistivity evaluation was made using an air flow resistance meter at the room temperature based on the ISO 9053 test standards.

9

TABLE 2

| | Air flow resistivity (N s/m⁴) |
|---|---|
| Present Example 1 | $72 * 10^3$ |
| Present Example 2 | $58 * 10^3$ |
| Present Example 3 | $46 * 10^3$ |
| Present Example 4 | $30 * 10^3$ |
| Comparative Example 1 | $94 * 10^3$ |
| Comparative Example 2 | $75 * 10^3$ |

Referring to Table 2, Present Examples 1 to 4 showed lower air flow resistivity than Comparative Examples 1 and 2. In other words, it may be seen that the sound-absorbing material including the heat-sealed non-woven fabric, the melt blown non-woven fabric, and the dot-pattern adhesive layer is able to effectively absorb the noise in the high-frequency range by improving the air permeability.

According to one embodiment of the present disclosure, the sound-absorbing material for the electric vehicle that may effectively absorb the high-frequency noise by reducing the air flow resistivity to improve the air permeability may be provided.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. A sound-absorbing material for an electric vehicle, the sound-absorbing material comprising:
   a heat-sealed non-woven fabric;
   a dot-pattern adhesive layer disposed on the heat-sealed non-woven fabric; and
   a melt blown non-woven fabric disposed on the dot-pattern adhesive layer.

2. The sound-absorbing material of claim 1, wherein the heat-sealed non-woven fabric is disposed on a sound receiving side.

3. The sound-absorbing material of claim 1, wherein the heat-sealed non-woven fabric is obtained from a constituent fiber comprising at least one selected from a group consisting of thermoplastic polyester elastomer, polycaprolactone, polybutylene terephthalate, polyethylene terephthalate, polyacrylonitrile, polypropylene, polyethylene, polyurethane, and mixtures thereof.

4. The sound-absorbing material of claim 1, wherein the heat-sealed non-woven fabric has a constituent fiber thickness in a range of about 2 to about 5 denier and a weight for each unit area size in a range of about 40 to about 80 g/m².

5. The sound-absorbing material of claim 1, wherein the melt blown non-woven fabric comprises at least one selected from a group consisting of thermoplastic polyester elastomer, polycaprolactone, polybutylene terephthalate, polyethylene Terephthalate, polyacrylonitrile, polypropylene, polyethylene, polyurethane, and mixtures thereof.

6. The sound-absorbing material of claim 1, wherein the melt blown non-woven fabric has a constituent fiber thickness in a range of about 0.5 to about 20 μm and a weight for each unit area size in a range of about 40 to about 80 g/m².

7. The sound-absorbing material of claim 1, wherein the heat-sealed non-woven fabric and the melt blown non-woven fabric are bonded together via the dot-pattern adhesive layer.

8. The sound-absorbing material of claim 1, wherein the dot-pattern adhesive layer contains a plurality of dots arranged to be spaced apart from each other and made of an adhesive polymer resin.

9. The sound-absorbing material of claim 1, wherein the dot-pattern adhesive layer contains a plurality of dots arranged to be spaced apart from each other at a spacing in a range of about 0.05 to about 0.08 mm and having a diameter in a range of about 0.03 to about 0.08 mm.

10. The sound-absorbing material of claim 8, wherein the adhesive polymer resin comprises at least one selected from a group consisting of nylon, polyacrylonitrile, polystyrene, polyvinyl chloride, polyvinyl alcohol, an ethylenevinyl chloride resin, an ethylene vinyl acetate resin, polyurethane, polyester, polyvinylacetate, and mixtures thereof.

11. The sound-absorbing material of claim 1, wherein the dot-pattern adhesive layer has a weight for each unit area size in a range of about 10 to about 26 g/m².

12. The sound-absorbing material of claim 1, further comprising:
   a polyurethane foam layer disposed on the melt blown non-woven fabric.

13. The sound-absorbing material of claim 12, wherein the polyurethane foam layer has a thickness in a range of about 15 to about 30 mm and a density in a range of about 12 to about 20 kg/m³.

14. The sound-absorbing material of claim 12, further comprising:
   a heat-sealed non-woven fabric disposed on the polyurethane foam layer.

15. The sound-absorbing material of claim 12, further comprising:
   a melt blown non-woven fabric disposed on the polyurethane foam layer.

16. The sound-absorbing material of claim 15, further comprising:
   a dot-pattern adhesive layer disposed on the melt blown non-woven fabric.

17. The sound-absorbing material of claim 16, further comprising:
   a heat-sealed non-woven fabric disposed on the dot-pattern adhesive layer.

18. A sound-absorbing material for an electric vehicle, the sound-absorbing material comprising:
   a heat-sealed non-woven fabric;
   a dot-pattern adhesive layer disposed on the heat-sealed non-woven fabric;
   a melt blown non-woven fabric disposed on the dot-pattern adhesive layer;
   a polyurethane foam layer disposed on the melt blown non-woven fabric; and
   a heat-sealed non-woven fabric disposed on the polyurethane foam layer.

19. A sound-absorbing material for an electric vehicle, the sound-absorbing material comprising:
   a heat-sealed non-woven fabric;
   a dot-pattern adhesive layer disposed on the heat-sealed non-woven fabric;
   a melt blown non-woven fabric disposed on the dot-pattern adhesive layer;
   a polyurethane foam layer disposed on the melt blown non-woven fabric;
   a melt blown non-woven fabric disposed on the polyurethane foam layer;
   a dot-pattern adhesive layer disposed on the melt blown non-woven fabric; and a heat-sealed non-woven fabric disposed on the dot-pattern adhesive layer.

20. An electric vehicle comprising the sound-absorbing material of claim 1.

* * * * *